G. DUNLOP.
Improvement in Ash-Boxes.
No. 131,607. Patented Sep. 24, 1872.
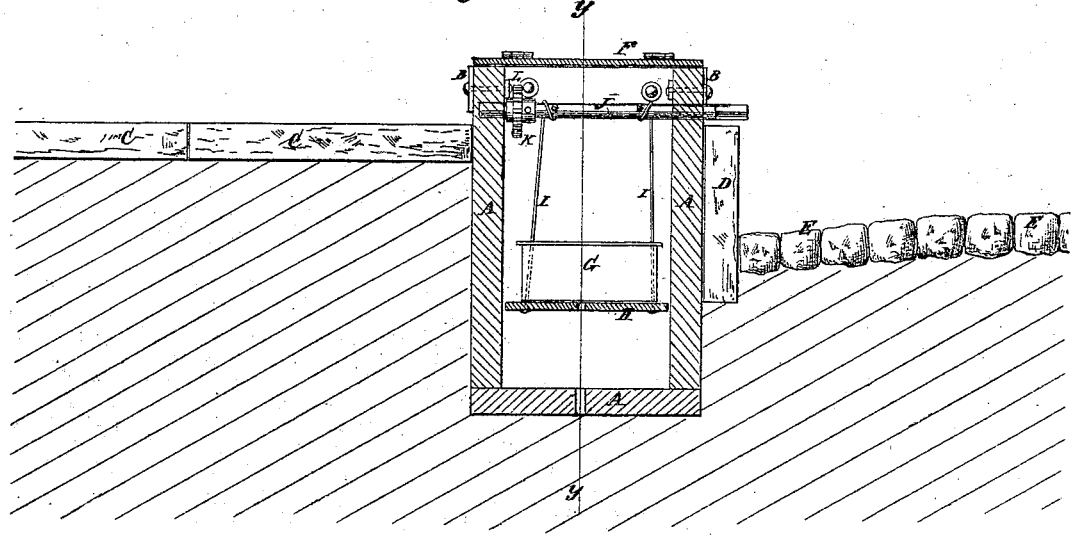
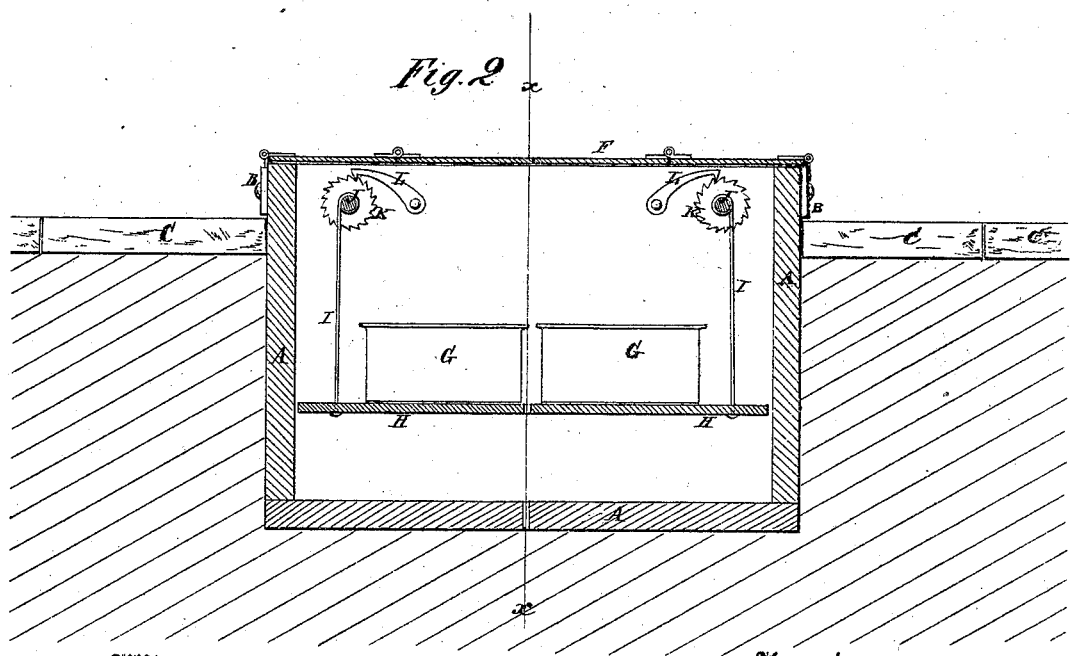
Witnesses:
A. W. Almqvist
N. A. Graham
Inventor:
George Dunlop
per Attorneys

UNITED STATES PATENT OFFICE.

GEORGE DUNLOP, OF WILLIAMSBURG, NEW YORK.

IMPROVEMENT IN ASH-BOXES.

Specification forming part of Letters Patent No. 131,607, dated September 24, 1872.

*To all whom it may concern:*

Be it known that I, GEORGE DUNLOP, of Williamsburg, in the county of Kings and State of New York, have invented a new and useful Improvement in Stone Ash-Box, of which the following is a specification:

In the accompanying drawing, Figure 1 is a detail cross-section of my improved ash-box taken through the line $x\ x$, Fig. 2. Fig. 2 is a detail longitudinal section of the same taken through the line $y\ y$, Fig. 1.

Similar letters of reference indicate corresponding parts.

My invention has for its object to furnish an improved box for ashes, garbage, &c., which shall be simple in construction, strong and durable, which will not absorb and afterward give out offensive and unhealthy odors, can be readily cleaned, will be convenient in use, and will prevent the ashes and garbage from being scattered over the sidewalk and street; and it consists in the construction and combination of the various parts of the box, as hereinafter more fully described.

A represents the body of my improved ash-box, the bottom ends and sides of which are formed of flag-stones or stone slabs, which, when the box is designed to be portable, are connected together by angle-irons B. The box is designed to be set in the sidewalk, as shown in Figs. 1 and 2, in which views C represents the sidewalk, D curb-stones, and E the roadway. The box may be set into the ground so that its top or cover F may be flush with the pavement C, or it may rise above said pavement to any desired extent. The bottom of the box A should have a hole formed in it, as shown in Figs. 1 and 2, which hole is designed to be connected with the sewer, so that any liquids that may be thrown or may flow into it may drain off into the sewer. The box A is provided with a cover, F, which is made in sections hinged to each other, and the outer sections hinged to the box A, as shown in Figs. 1 and 2. The ashes, garbage, &c., are designed to be put into boxes G of such a size as to be conveniently handled, and which are set in the box A as filled, so that they may be removed by the ashman in his rounds. The box A may be made shallow so as to contain a single tier of boxes, G, or it may be made deeper to contain two or more tiers of said boxes. In the latter case I prefer to provide the box with a movable platform or false bottom, H, to which, at or near its four corners, are attached the lower ends of the ropes or chains I. The upper ends of the two ropes or chains I, at each end of the box, are attached to a shaft, J, which revolves in holes or bearings in the sides of the box A. One end of each of the shafts J should project and be squared off to receive a key, crank, or ratchet wrench for turning the said shafts J to wind up or unwind the cords or chains I, and thus raise or lower the platform H and the boxes G placed upon it. The shafts J should be provided with ratchet-wheels K and pawls L to hold them securely in any position into which they may be adjusted.

In using the box the platform H is raised into such a position that it can receive but one tier of boxes, G. When that tier is filled the platform is lowered sufficiently to receive a second tier, and so on, the boxes being always at the top of the box A. In emptying the box A the top tier of boxes G is removed and emptied, and the platform H is then raised to bring the next tier of boxes G to the top of the box A, and so on until all have been emptied.

Having thus described my invention, I claim as new, and desire to secure by Letters Patent—

The combination, with an ash-box, of the platform H, ropes or chains I, and shafts J, provided with ratchet-wheels and pawls K L, substantially as herein shown and described, and for the purpose set forth.

GEORGE DUNLOP.

Witnesses:
JAMES T. GRAHAM,
T. B. MOSHER.